(12) United States Patent
Ying et al.

(10) Patent No.: US 9,832,247 B2
(45) Date of Patent: Nov. 28, 2017

(54) PROCESSING VIDEO DATA IN A CLOUD

(71) Applicant: INTEL CORPORATION, Santa Clara, CA (US)

(72) Inventors: Zhiwei Ying, Shanghai (CN); Changliang Wang, Bellevue, WA (US); Guei-Yuan Lueh, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 297 days.

(21) Appl. No.: 13/976,676

(22) PCT Filed: Sep. 28, 2012

(86) PCT No.: PCT/CN2012/082282
§ 371 (c)(1),
(2) Date: Jun. 27, 2013

(87) PCT Pub. No.: WO2014/047867
PCT Pub. Date: Apr. 3, 2014

(65) Prior Publication Data
US 2014/0244804 A1 Aug. 28, 2014

(51) Int. Cl.
*G06F 15/16* (2006.01)
*H04L 29/06* (2006.01)
(Continued)

(52) U.S. Cl.
CPC ........ *H04L 65/602* (2013.01); *H04L 65/4069* (2013.01); *H04L 65/604* (2013.01);
(Continued)

(58) Field of Classification Search
CPC ....... G06F 9/50; H04L 67/10; H04L 65/4069; H04L 65/602; H04L 65/607; H04L 65/604; H04W 4/003; H04N 21/2743
See application file for complete search history.

(56) References Cited

U.S. PATENT DOCUMENTS 8,649,659 B2 * 2/2014 Lalwaney ...................... 386/241
8,893,207 B2 * 11/2014 Perlman et al. .............. 725/116
(Continued)

FOREIGN PATENT DOCUMENTS

CN 102281473 12/2011
CN 102404615 4/2012
(Continued)

OTHER PUBLICATIONS

International Search Report and Written Opinion for China Patent Application No. PCT/CN2012/082282 Mailed Jul. 4, 2013, 10 Pages.
(Continued)

*Primary Examiner* — Cheikh Ndiaye
(74) *Attorney, Agent, or Firm* — Blakely, Sokoloff, Taylor & Zafman LLP

(57) ABSTRACT

The video processing (VP) tasks may be moved from a client device such as a smart phone, tablet, or a laptop to a cloud processing device provided in a cloud to save conserve power in the client device. In one embodiment, the cloud processing device may process the video data based on the optimized video processing parameters, which may be generated using one or more modified VPPs. The modified VPPs may be provided by the client device based on the size (small, medium, and large, for example) of the screen of the client device. Further, the cloud processing device may support an automatic adaption mode (AAM) in which the cloud processing device may process the video data based on the availability of the network bandwidth value provided by the client device.

26 Claims, 7 Drawing Sheets

(51) Int. Cl.
*H04W 4/00* (2009.01)
*H04N 21/2743* (2011.01)
(52) U.S. Cl.
CPC ........... *H04L 65/607* (2013.01); *H04W 4/003* (2013.01); *H04N 21/2743* (2013.01); *Y02B 60/50* (2013.01)

(56) References Cited

U.S. PATENT DOCUMENTS

| | | |
|---|---|---|
| 2011/0153727 A1 | 6/2011 | Li |
| 2012/0087634 A1 | 4/2012 | Lalwaney |
| 2014/0258552 A1* | 9/2014 | Oyman et al. ................ 709/231 |

FOREIGN PATENT DOCUMENTS

| | | |
|---|---|---|
| CN | 102595208 | 7/2012 |
| CN | 102595242 | 7/2012 |
| CN | 102611914 | 7/2012 |
| CN | 102651825 | 8/2012 |
| WO | WO-2012033667 | 3/2012 |
| WO | WO 2012096671 A1 * | 7/2012 |

OTHER PUBLICATIONS

Chinese Application No. 201280075488.3, Office Action, dated May 25, 2017, 8 pgs.

* cited by examiner

PROCESSING VIDEO DATA IN A CLOUD

CLAIM OF PRIORITY

This application is a U.S. National Phase application under 35 U.S.C. §371 of International Application No. PCT/CN2012/082282, filed Sep. 28, 2012, entitled "PROCESSING VIDEO DATA IN A CLOUD," the entire contents of which are incorporated herein by reference.

BACKGROUND

Currently, video processing (VP) tasks such as processing of scaling, hue, saturation, brightness, contrast, sharpness, rotation, may be performed in a client device such as a laptop, netbook, and ultrabook type of computers, handheld devices, smart phones, music players, and such other devices. The users of such client devices may watch videos online. The video may be downloaded in real-time from a server and rendered (or played) on the client device. If the user of the client device changes parameters for one or more video processing features, the video player may request a video driver to perform the video processing. The video driver may generate commands to a hardware unit such as a graphics processing unit (GPU) to perform the VP or may use a software simulation to do the post-processing using a central processing unit (CPU). The power consumed by the GPU or the CPU to perform VP tasks may be substantial and such substantial power consumption may considerably decrease the power back-up of the client device.

An issue with such an approach is that the VP tasks require more power for the GPU and some platforms may not even have the VP capabilities. One of the approaches uses scalable video coding (SVC), which may provide the encoding of a high-quality video bit streams. The high-quality video bit streams may include one or more subset bit streams, which may be created by dropping packets from a larger video file to reduce the bandwidth required for the subset bit stream. The subset bit stream may represent a lower spatial resolution, lower temporal resolution, or lower quality video signal.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
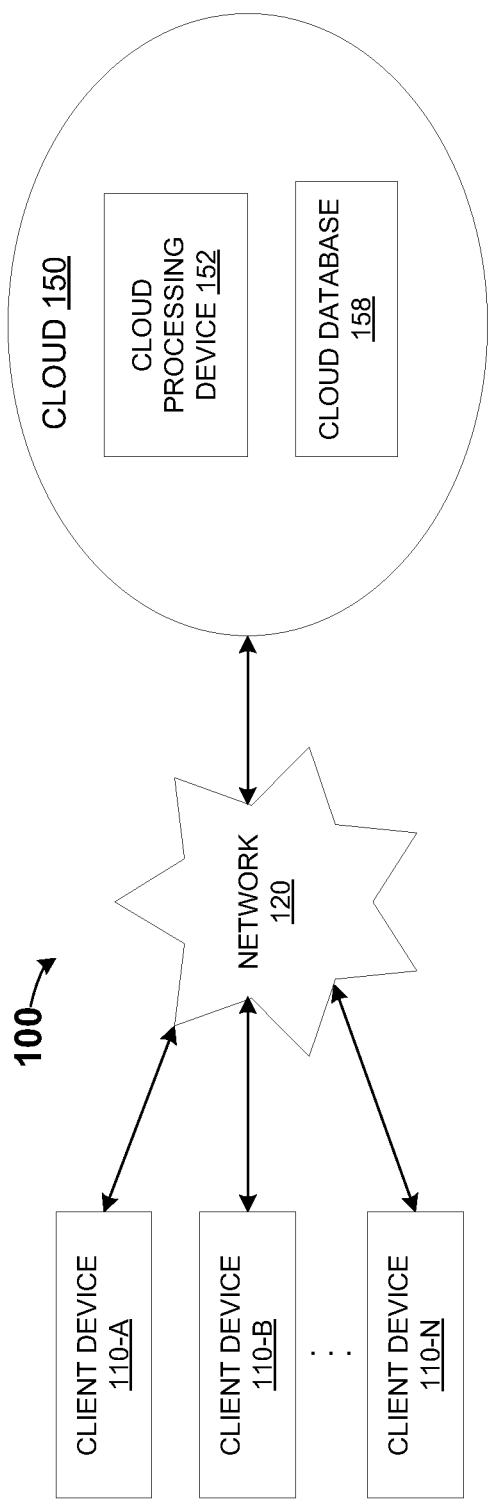
FIG. 1 illustrates a computing environment 100, which supports processing of video data in the cloud in accordance with one embodiment.

The following description describes embodiments of a technique to post weakly ordered transactions. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

In one embodiment, the video processing (VP) tasks may be transferred from a client device to a cloud processing device provided in a cloud. In one embodiment, a platform included in client device may include a video controller, which may determine if the VP tasks are to be transferred to the cloud processing device. In one embodiment, the video controller may check if the client device is operating in a battery mode before requesting the cloud processing device to perform the VP tasks. In other embodiment, the video controller may check if the video (which may be stored in a remote database) is viewed in an online mode. In one embodiment, the video controller may then determine that the VP tasks may be handled by the cloud processing device and the client device may send requests to the cloud processing device to perform video processing tasks.

In one embodiment, the client device may then send the video processing parameters to the cloud processing device. In response the cloud processing device may perform the video processing tasks and create a video file after processing the video data based on the video processing parameters. In one embodiment, the video file may be stored in the cloud database. In one embodiment, the client device may retrieve the video data, which is already processed, from the cloud databases. In other embodiment, the cloud processing device may stream the video data to the client device in response to the request received from the client device.

In one embodiment, the power consumption on the client device is substantially conserved as the power hungry or power intensive video processing tasks may be performed by the cloud processing device. In one embodiment, the cloud processing device may be best suited to perform power intensive and computationally intensive tasks as the VP tasks. In one embodiment, the cloud processing device may include substantial amounts of resources to perform such computationally intensive tasks. Further, such computationally intensive tasks may be performed in a distributed and parallel mode, which may increase the speed of performing video processing.

Further, for different video clips, the default video processing parameters (VPP) may be not the best one. In one embodiment, the user of the client device 110-A may modify the video processing parameters (VPP) and send the VPP to the cloud. In one embodiment, the cloud may collect such VPP and determine the optimized video post processing parameters. In one embodiment, the cloud may use the optimized VPPs to process the video data if a request for the same video clips is received from the client device.

Also, the embodiments described here may be used to handle unstable network situations. In one embodiment, the cloud may support an automatic adaption mode (AAM). In one embodiment, the client device may detect the network bandwidth value and send a request to the cloud to enable the AAM mode. In one embodiment, the request may include the network bandwidth value or any other indicator of the network bandwidth. In one embodiment, the cloud may initiate the AAM and based on the network bandwidth value or the indicator of the network bandwidth, the cloud may switch between different scaling parameters. For example, the client device may detect that the network bandwidth is very low and in response the scaling factor may be aggressively scaled down to (e.g., 64×48). Further, the scaling factor may change to (128×96), or (320×240), or (640×480), if the availability of the network bandwidth improves. In one embodiment, the user may experience smooth video play back even in an unstable network environment if AAM is enabled.

An embodiment of a computing environment 100, which may support processing of video data in a cloud processing device, is illustrated in FIG. 1. In one embodiment, the computing environment 100 may include one or more client devices 110-A to 110-N, a network 120, and a cloud 150, which may comprise a cloud processing device 152 and a cloud database 158. However, the cloud 150 may comprise many other blocks such as the cloud services block, cloud storage block, cloud servers, and such blocks are not depicted here for brevity.

In one embodiment, the network 120 may comprise one or more network devices such as a switch or a router, which may receive the messages or packets, process the messages, and send the messages to an appropriate network device provisioned in a path to the destination system. The network 120 may enable transfer of messages between one or more of the client devices 110 and the cloud 150. The network devices of the network 120 may be configured to support various protocols such as TCP/IP.

In one embodiment, the client devices 110-A to 110-N may determine whether the video processing tasks are to be performed in the cloud 150 and may send a request signal to the cloud 150 to perform the video processing tasks. In one embodiment, the client device 110 may determine whether the VP tasks may be transferred to the cloud processing device. In one embodiment, the client device 110 (110-A, for example) may check if the client device is operating in a battery mode before requesting the cloud 150 to perform the VP tasks. In other embodiment, the client device 110-A may check if the video (which may be stored in a database in a cloud) is to be viewed in an online mode.

In one embodiment, the client device 110-A may then determine that the VP tasks may be handled by a cloud processing device provided in the cloud 150. In one embodiment, the client device 110-A may send requests to the cloud 150 to perform video processing (VP) tasks. In one embodiment, the client device 110-A may then send the video processing parameters and the video data to the cloud 150. In one embodiment, the client device 110-A may send video processing parameters such as for example, "video[xx] scale[320:240]". In one embodiment, the client device may render the video data on the display after the client device decodes the video data [xx]. In one embodiment, the client device 110-A may send VPP such as for example, Scale [320×240], Hue [0], Saturation [1], Brightness [0], Contrast [1], Sharpness [44] along with the video [xx].

In one embodiment, in response to sending the VPPs, the client device 110-A may receive a signal from the cloud 150 that may indicate the availability of a video file, which may be generated based on the processing the video data using the VPPs. In one embodiment, the client device 110-A may retrieve the video data encoded by the cloud processing device 152, decode the video data, perform up-scaling if required and render the video data on the display. In other embodiment, the client device 110-A may receive the video data from the cloud 150, decode, and then render the decoded video data on the display.

Further, for different video clips, the default video processing parameters (VPP) may be not the best one. In one embodiment, the user of the client device 110-A may modify the video processing parameters (VPP) (modified VPPs) and send the VPPs to the cloud processing device 152. In one embodiment, in response to sending such modified VPPs, the client device 110-A may receive the video data (from the cloud processing device 152), which may be processed using the optimized VPPs if the client device 110-A requests for the same video clips.

Also, the embodiments described here may be used to handle unstable network situations. In one embodiment, the client device 110-A may support an automatic adaption mode (AAM). In one embodiment, the client device 110-A may determine the network bandwidth value based on the bandwidth available on the links coupling the client device 110-A to the network 120 and send a request to the cloud processing device 152 to enable the AAM mode. In one embodiment, the request may include the network bandwidth value or any other indicator of the network bandwidth. For example, the client device 110-A may detect that the network bandwidth is very low and in response the scaling factor may be aggressively scaled down to (e.g., 64×48). Further, the scaling factor may change to (128×96), or (320×240), or (640×480), if the availability of the network bandwidth improves. In one embodiment, the user may experience smooth video play back even in an unstable network environment if AAM is enabled.

In one embodiment, the cloud processing device 152 may process video data in response to a request received from the client device 110-A, for example. In one embodiment, the cloud processing device 152 may receive video processing parameters (VPP) and the video data and process the video data based on the VPP. In one embodiment, the cloud processing device 152 may create a video file by processing the video data based on the VPP. In one embodiment, the cloud processing device 152 may store the video file in the cloud database 158 and send a signal to the client device 110-A indicating the availability of the video file. In other embodiments, the cloud processing device 152 may send the video file to the client device 110-A.

In one embodiment, the cloud processing device 152 may perform processing on the video data, which may include denoise, FMD, deinterlace, deblocking, scaling, shapening, rotation, ProcAmp, and other tasks. In one embodiment, the cloud processing device 152 may consume substantial amounts of computing resource and power and the cloud processing device 152 may be designed to include the computing resources for performing the video processing tasks. Also, in one embodiment, by transferring the power intensive video processing tasks to the cloud processing device 152, the battery back-up duration of the client device 110-A may be considerably increased.

In one embodiment, the cloud processing device 152 may determine the optimized video post processing parameters in response to receiving the modified VPPs for different video clips. In one embodiment, the cloud processing device 152 may use the optimized VPPs to process the video data if a request for the same video clips is received from the client device 110-A. In one embodiment, such an approach may allow the users to view the video clips with a resolution, which may best suit the display device area. For example, the scaling factor of the video clip may be (128×96) if the client device 110-A is a small screen device, the scaling factor of the video clip may be (320×240) if the client device 110-A is a medium screen device, and the scaling factor of the video clip may be (640×480) if the client device 110-A is a big screen device. In one embodiment, the cloud processing device 152 may chose the scaling factor (or resolution), automatically, based on the optimized VPPs without having to receive inputs for the scaling factor for different video clips.

Further, in one embodiment, the cloud processing device 152 may support an automatic adaption mode (AAM) and based on the network bandwidth value or the indicator of the network bandwidth, provided by the client device 110-A, the cloud processing device 152 may initiate the AAM. In one embodiment, the cloud processing device 152 may switch between different scaling parameters based on the available network bandwidth. For example, the client device may detect that the network bandwidth is very low and in response the scaling factor may be aggressively scaled down to (e.g., 64×48). Further, the scaling factor may change to (128×96), or (320×240), or (640×480), if the availability of the network bandwidth improves. In one embodiment, the user may experience smooth video play back even in an unstable network environment if AAM is enabled.

In one embodiment, by transferring the video processing tasks to cloud processing device 152, the power consumption on the client device 110-A may be conserved. Also, in one embodiment, the cloud processing device 152 may be better suited to perform power intensive and computationally intensive tasks such as the VP tasks.

Figure 2:
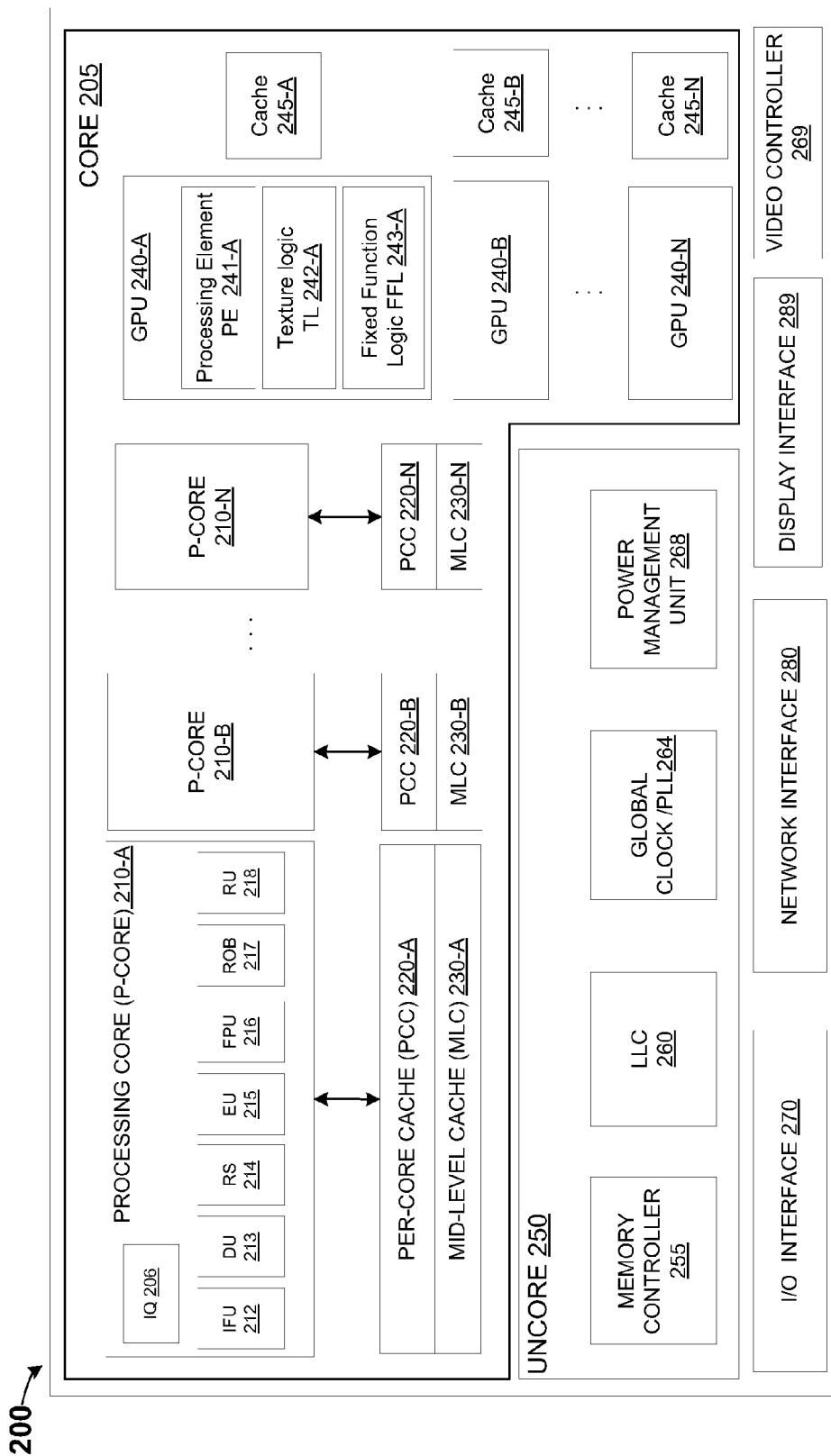
FIG. 2 illustrates a computing platform, which may be used in a client device and a cloud processing device to support processing of video data in the cloud in accordance with one embodiment.

An embodiment of a computing platform 200, which may be used in the client device 110-A and the cloud processing device 152 to support processing of video data in the cloud 150 is illustrated in FIG. 2. In one embodiment, the platform 200 may comprise a core area 205, an uncore area 250, and an interface area, which may include I/O interface 270, a network interface 280, and a display interface 289. In one embodiment, the core 205 and the uncore 250 may support a point-to-point bi-directional bus to enhance communication between the processing cores (p-cores) 210-A to 210-N, GPUs 240-A and 240-N and between the core area 205 and the uncore area 250.

In one embodiment, the I/O interface 270 may provide an interface to I/O devices such as the keyboard, mouse, camera, display devices, and such other peripheral devices. In one embodiment, the I/O interface 270 may support, electrical, physical, and protocol interfaces to the peripheral devices. In one embodiment, the network interface 280 may provide an interface to the network such as the network 120. In one embodiment, the network interface 280 may support, electrical, physical, and protocol interfaces to the network. In one embodiment, the display interface 289 may couple the computing platform 200 to a display device.

In one embodiment, the uncore area 250 may include a memory controller 255, LLC 260, a global clock/PLL 264, a power management unit 268, and a video controller 269. In one embodiment, the memory controller 255 may interface with the memory devices such as the hard disk and solid state drives. In one embodiment, the global clock/PLL 264 may provide clock signals to different portions or blocks of the computing platform 200. In one embodiment, the portions may be formed based on, for example, the voltage planes and power planes and the clock these blocks or portions may be controlled by the power management unit 268 based on the workload, activity, temperature, or any other such indicators. The power management unit 268 may implement power management techniques such as dynamic voltage and frequency scaling, power gating, turbo mode, throttling, clock gating, and such other techniques.

In one embodiment, the core area 205 may comprise processing cores such as p-cores 210-A to 210-N, per-core caches 220-A to 220-N and mid-level caches 230-A to 230-N associated with the p-cores 210-A to 210-N. In one embodiment, the p-cores 210 may include an instruction queue 206, an instruction fetch unit IFU 212, a decode unit 213, a reservation station RS 214, an execution unit EU 215, a floating point execution unit FPU 216, a re-order buffer ROB 217, and a retirement unit RU 218. In one embodiment, each processor core 210-B to 210-N may each include blocks that are similar to the blocks depicted in the processing core 210-A and the internal details of each of the processing cores 210-B to 210-N is not shown for brevity. In one embodiment, the per-core caches 120 may include memory technologies that may support higher access speeds, which may decrease the latency of instruction and data fetches, for example.

In one embodiment, the computing platform 200 may include one or more graphics processing units (GPUs) 240-A to 240-N and each GPU 240 may include a processing element, a texture logic, and a fixed function logic such as the PE 241-A, TL 242-A, and FFL 243-A, respectively. In one embodiment, the sub-blocks within each of the GPU 240 may be designed to perform video processing tasks, which may include video pre-processing and video post-processing tasks.

As indicated above, the computing platform 200 may be used in the client device such as 110 and the cloud processing device such as 152. While the computing platform 200 is used in the client device, the video controller 269 may perform the operations as described below. In one embodiment, the video controller 269 may determine whether the video processing tasks are to be performed in the cloud processing device 152 and may send generate a request signal to the cloud processing device 152 to perform the video processing tasks. In one embodiment, the request signal may be sent to network interface 280, which may deliver the request signal to the cloud processing device 152. In one embodiment, the video controller 269 may determine whether to transfer the VP tasks to the cloud processing device 152 based on one or more conditions. In one embodiment, the video controller 269 may check if the client device 110 is operating in a battery mode. In other embodiment, the client device 110-A may check if the video (which may be stored in a database within a cloud, for example) is to be viewed in an online mode. In one embodiment, the video controller 269 may determine that the VP tasks are to be transferred to the cloud processing device 152 if the client device 110 is operating in a battery mode or the video is being viewed online in the client device 110.

In one embodiment, the video controller 269 may then generate the video processing parameters (VPP) and have the network interface 280 send the VPPs to the cloud processing device 152. In one embodiment, the video controller 269 may generate VPPs such as for example, "video [xx] scale[320:240]". In one embodiment, the video controller 269 may generate VPPs such as for example, Scale [320×240], Hue [0], Saturation [1], Brightness [0], Contrast [1], and Sharpness [44] along with the video [xx]. In one embodiment, the video controller 269 may receive a response from the client processing device 152 indicating the completion of the VP tasks and in response to the indication, the video controller 269 may initiate retrieval of the video file stored in the cloud database 158. In one embodiment, the video controller 269 may decode the video file and may fill the video buffers with the decoded video file, which may be used by a display device for rendering. In one embodiment, the video controller 269 may perform scaling-up operation after decoding the video file if a scaling operation is to be performed. In one embodiment, the video controller 269 may determine that a scaling-up operation is to be performed if the size of the display screen of the client device may be larger than the stream resolution size of the video file. In one embodiment, the video controller 269 may then fill the video buffers and the content of the video buffers may be used by the display for rendering the video content.

In one embodiment, the video controller 269 may determine if different video clips may be viewed in the client device 110-A and may modify the video processing parameters (VPP) to best suit the viewing of video clips. In one embodiment, the video controller 269 may modify the VPPs based on, for example, the type of the client device 110 or the size of the display screen used in the client device 110. In one embodiment, the video controller 269 may then coordinate with the network interface 280 to send the modified VPPs to the cloud processing device 152. In one embodiment, the client device 110-A may be a small screen device such as a smart phone and the client device 110-A may send one or more modified VPPs, as depicted by 715 of FIG. 7, to the cloud 150. In one embodiment, in response to sending such modified VPPs, the video controller 269 may receive the video data (from the cloud processing device 152), which may be processed using the optimized VPPs when the client device 110-A requests for the same video clips. In one embodiment, the small screen client device 110-A may receive processed video data, as depicted by 716 in FIG. 7, based on the optimized VPPs. In one embodiment, the size of the video data may be (128×96).

Figure 7:
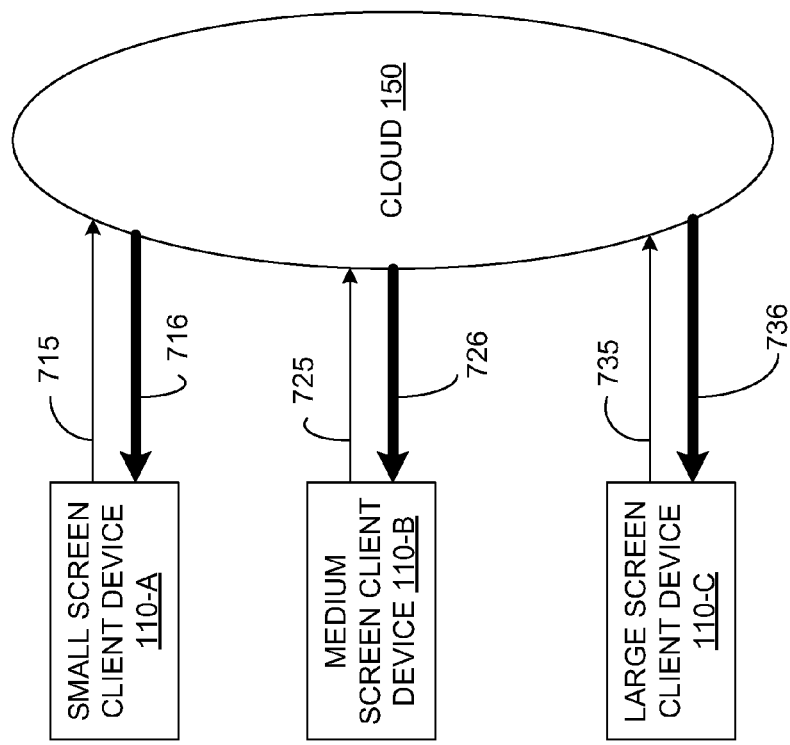
FIG. 7 is a computer system, which may support processing of video data in the cloud according to one embodiment.

Similarly, if the client device 110-A is device of medium screen size such as a tablet or any other mobile internet device, the client device 110-A may send the modified VPPs as depicted by 725 in FIG. 7 and may receive the processed video data of size (320×240), as depicted by 726 in FIG. 7. In one embodiment, if the client device 110-A is a large screen device such as a laptop, or a desktop or any other such computing device, the client device 110-A may send the modified VPPs as depicted by 735 in FIG. 7 and may receive the processed video data of size (640×480), as depicted by 736 in FIG. 7.

Figure 8:
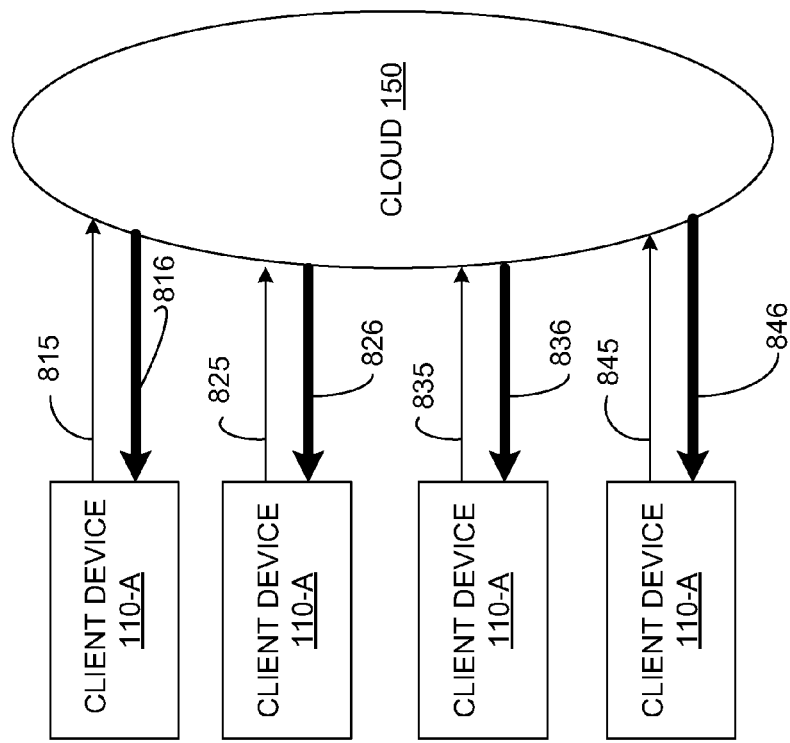
FIG. 8 is a wireless mobile device, which may support processing of video data in the cloud according to one embodiment.

In one embodiment, the video controller 269 may support handling of unstable network situations. In one embodiment, the video controller 269 may support an automatic adaption mode (AAM). In one embodiment, the video controller 269 may send a bandwidth detect signal to the network interface 280 and in response, the video controller 269 may receive the network bandwidth value based on the bandwidth available on the links coupling the client device 110-A to the network 120. In one embodiment, the video controller 269 may provide the network bandwidth values or any other indicator of the network bandwidth to the cloud processing device 152. For example, the video controller 269 may detect that the network bandwidth is very low, send the network bandwidth value to the cloud 150 as depicted by 815. In response to sending the network bandwidth value, the scaling factor may be aggressively scaled down to (e.g., 64×48) as depicted by 816 of FIG. 8. Further, the scaling factor may change to (128×96), or (320×240), or (640×480) as depicted, respectively, by 826, 836, and 846 of FIG. 8, if the availability of the network bandwidth improves. In one embodiment, the improvement in the availability of the network bandwidth may be provided to the cloud 150 as depicted by 825, 826, and 836 of FIG. 8. In one embodiment, the user may experience smooth video play back even in an unstable network environment if AAM is enabled.

While the computing platform 200 is used in a cloud processing device 152, the video controller 269 may receive a request to perform VP tasks if the client device 110-A determines to transfer the VP tasks to the cloud 150. In one embodiment, the video controller 269 may determine the VP tasks to be performed based on the fields included in the request. In one embodiment, the video controller 269 may chose one or more GPU 240 to perform the VP tasks. In one embodiment, the video controller 269 may receive video data and one or more video processing parameters after receiving a request to process the video data from the client device 110-A. In one embodiment, the video controller 269 may assign or initiate the VP tasks on the GPU 240 or the thread so the GPU 240. In other embodiment, the video controller 269 may also request the p-cores 210 or one or more threads supported by the p-cores 210 to perform the video processing tasks. In one embodiment, the GPUs 240 or the p-cores 210, as the case may be, may perform one or more video processing tasks and may send an indication to video controller 269 to indicate the completion of the VP tasks. In one embodiment, the GPU 240 or the p-core 210 may perform one or more operations on the video data, which may include de-noising, firm mode detection (FMD), de-interlacing, deblocking, scaling, sharpening, rotating, processing amplifier, and other tasks. In one embodiment, the video controller 269 may create a video file in response receiving the indicator. In one embodiment, the video controller 269 may store the video file in the cloud database 158 and send a signal to the client device 110-A indicating the availability of the video file. In other embodiment, the video controller 269 may cause the video file to be sent to the client device 110-A.

In one embodiment, the video controller 269 may determine the optimized video post processing parameters (VPPs) in response to receiving the modified VPPs for different video clips. In one embodiment, the video controller 269 may determine the optimized VPPs based on, for example, a statistical result of user's choices. For example, if majority of the users choose a particular set of VPPs, then that may become the optimized VPP and in other example, the optimized VPPs may be defined by the video experts. In one embodiment, the video controller 269 may use the optimized VPPs to process the video data if a request for the same video clips is received from the client device 110-A. In one embodiment, such an approach may allow the users of the client device 110-A to view the video clips with a resolution, which may best suit the display device area. For example, the video controller 269 may use the optimized VPPs to generate a video clip with a bit stream of (128×96) if the cloud processing device 152 determines that the client device 110-A is a small screen device. Similarly, the video controller 269 may use the optimized VPPs to generate a video clip with a bit stream of (320×240), (640×480), (1080×760) or such other bit streams for client devices with different screen sizes.

In one embodiment, the video controller 269 may support an automatic adaption mode (AAM) and based on the network bandwidth value or the indicator of the network bandwidth, provided by the client device 110-A, the video controller 269 may initiate the automatic adaption mode. In one embodiment, the video controller 269 may switch between different scaling factors or values based on the available network bandwidth. For example, the video controller 269 may chose the scaling factors for the video data based on the bandwidth available on the network. In one embodiment, video controller 269 may change the scaling values, for example, between (64×48), (128×96), (320×240), or (640×480) or any other such scaling values based on the network bandwidth availability. In one embodiment, the video controller 269 may be depicted as being an independent unit outside the core 205 and the uncore 250, however, the video controller 269 may be placed within the core area 205, or the uncore area 250, or any other such variations may be possible and those variations are contemplated to be within the scope of the embodiments of the present invention.

Figure 3:
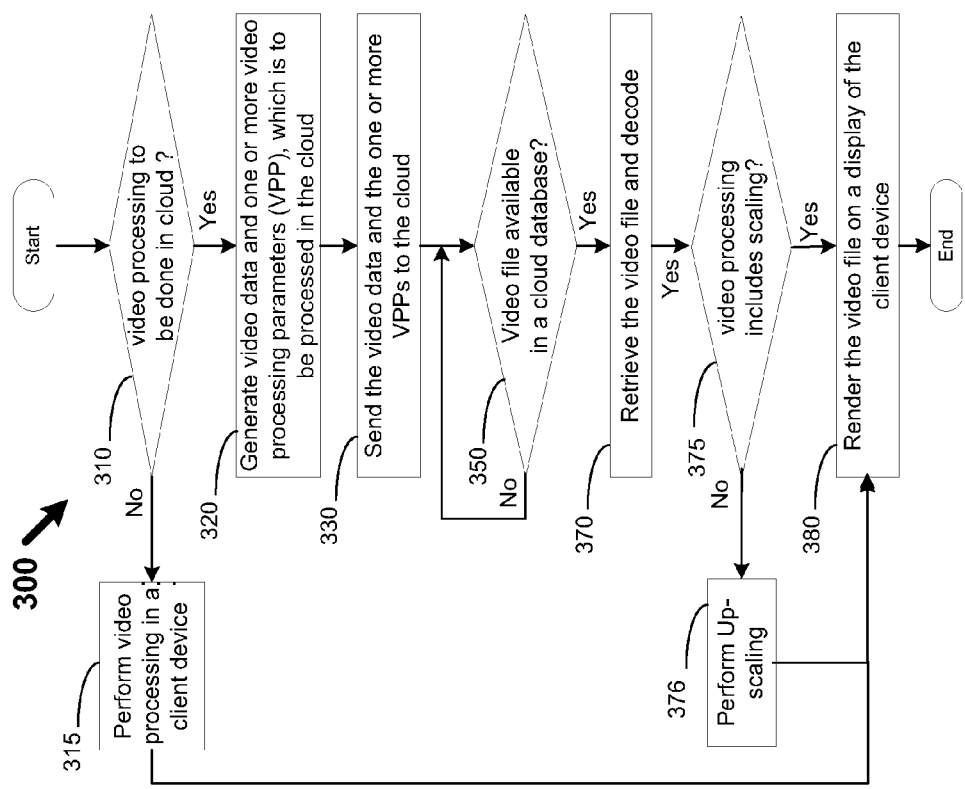
FIG. 3 is a flow-chart, which illustrates an operation of the client device to support processing of video data in the cloud in accordance with one embodiment.

An embodiment of an operation of the client device 110-A to support transfer of video processing tasks to a cloud is illustrated in flow-chart of FIG. 3. In block 310, the client device 110-A (or the video controller 269) may determine if the video processing tasks are to be done in the cloud 150 and control passes to block 320 if the video processing tasks are to be transferred to the cloud 150 and to block 315 otherwise. In one embodiment, the client device 110-A may determine to transfer the VP tasks based on whether the client device 110-A is being operated in a battery mode or on the network bandwidth that is available or any other such conditions, which may indicate that the cloud 150 is better suited to perform the VP tasks. In block 315, the client device 110-A may perform the video processing tasks in the client device 110-A.

Figure 5:
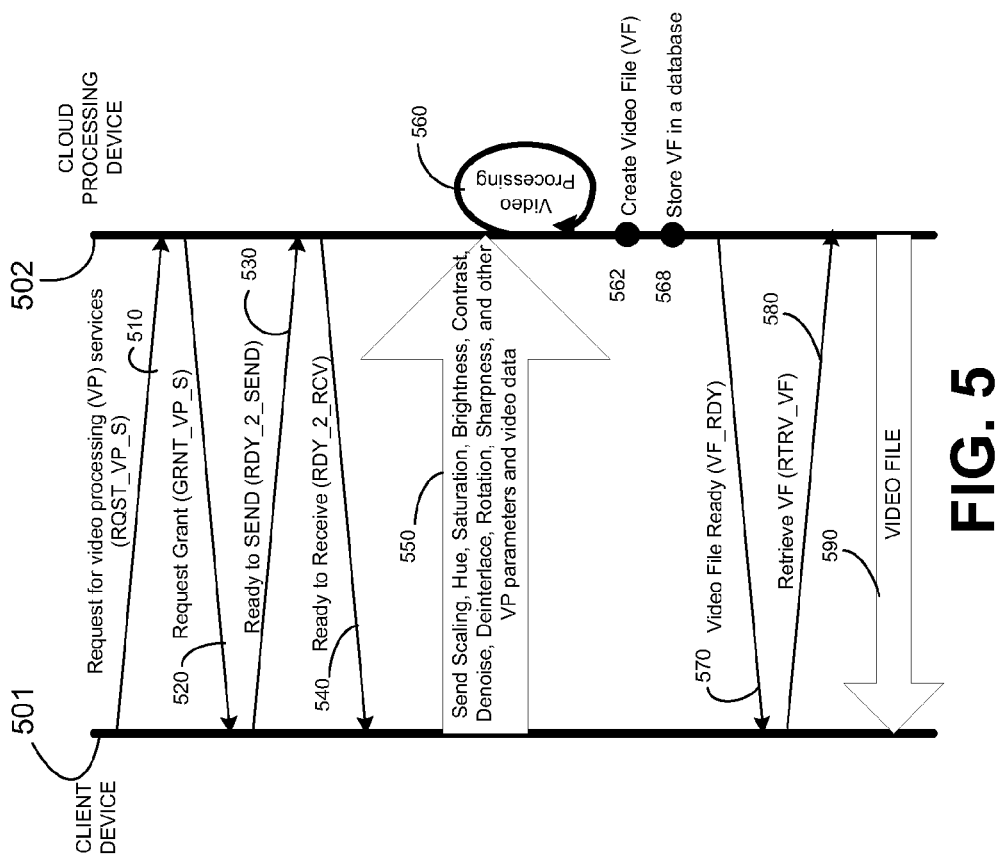
FIG. 5 illustrates a set of signals, which may be exchanged between the client device and the cloud processing device to support processing of video data in the cloud in accordance with one embodiment.

In block 320, the client device 110-A may generate video data and one or more VPPs, which may be processed in the cloud processing device 152. In block 330, the client device 110-A may send the video data and the one or more VPPs to the cloud processing device 152. In one embodiment, the client device 110-A may send a request for video processing services (RQST_VP_S) signal 510 (depicted in FIG. 5) to the cloud 150 and may receive a request granted (GRNT_VP_S) signal 520 from the cloud 150. Further, the client device 110-A may send a ready to SEND (RDY_2_SEND) signal 530 to the cloud 150 and may receive a ready to receive (RDY_2_RCV) signal 540. In one embodiment, the client device 110-A and the cloud 150 may exchange the above handshake signals before the client device 110-A sends the video data and the VPPs to the cloud 150 as depicted by signal 550 in FIG. 5.

In block 350, the client device 110-A may check if the video file is available in the cloud database 158 and if the video file is available control passes to block 370. In one embodiment, the client device 110-A may receive a signal such as a video file ready (VF_RDY) signal 570 (depicted in FIG. 5) from the cloud processing device 152 after the video file is stored/saved in the cloud database 158 by the cloud processing device 152.

In block 370, the client device 110-A may retrieve the video file from the cloud database 158. In one embodiment, the client device 110-A may send a retrieve video file (RTRV_VF) signal 580 (depicted in FIG. 5) to the cloud processing device 152 in response to receiving the VF_RDY signal 570. In one embodiment, the client device 110-A may retrieve the video file as depicted by the signal 590 in FIG. 5.

In block 375, the client device 110-A (i.e., the video controller 269 within the client device 110-A) may determine if a scaling operation has to performed on the video data received and control passes to block 376 if the scaling has to be performed and to block 380 otherwise.

In block 375, the p-cores 210 or the GPUs 240 may perform the scaling operation and control passes to block 380. In block 380, the video controller 269 may render the video data on a display of the client device 110-A.

Figure 4:
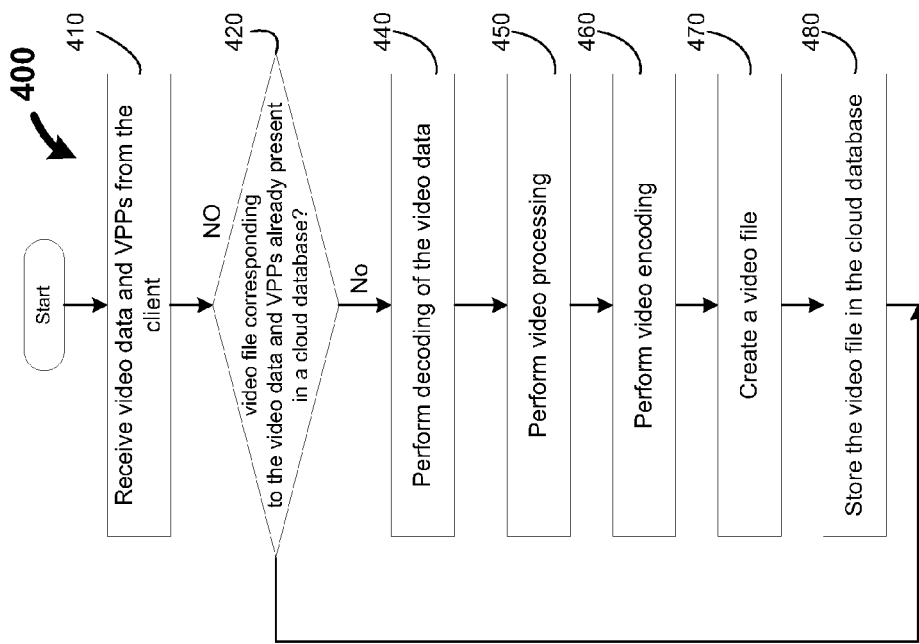
FIG. 4 is a flow-chart, which illustrates an operation of the cloud processing device to support processing of video data in the cloud in accordance with one embodiment.

An embodiment of an operation of the cloud processing device 152 to support performing of video processing tasks in a cloud is illustrated in flow-chart of FIG. 4. In block 410, the cloud processing device 152 may receive video data and VPPs from the client device 110-A In one embodiment, before receiving the video data and VPPs, the client device 110-A and the cloud processing device 152 may have exchanged one or more handshake signals such as signals 510 to 540. In one embodiment, the cloud processing device 152 may receive the video data and the VPPs as depicted by the signal 550 of FIG. 5.

In block 420, the cloud processing device 152 may determine if a video file is already present in the cloud database 158. In one embodiment, the same video data processed using different sets of VPPs may result in different video files. In one embodiment, the cloud processing device 152 may check whether a video file corresponding to the VPPs received from the client device 110-A is already present in the cloud database 158 and if the video file is not present control passes to block 440.

Figure 6:
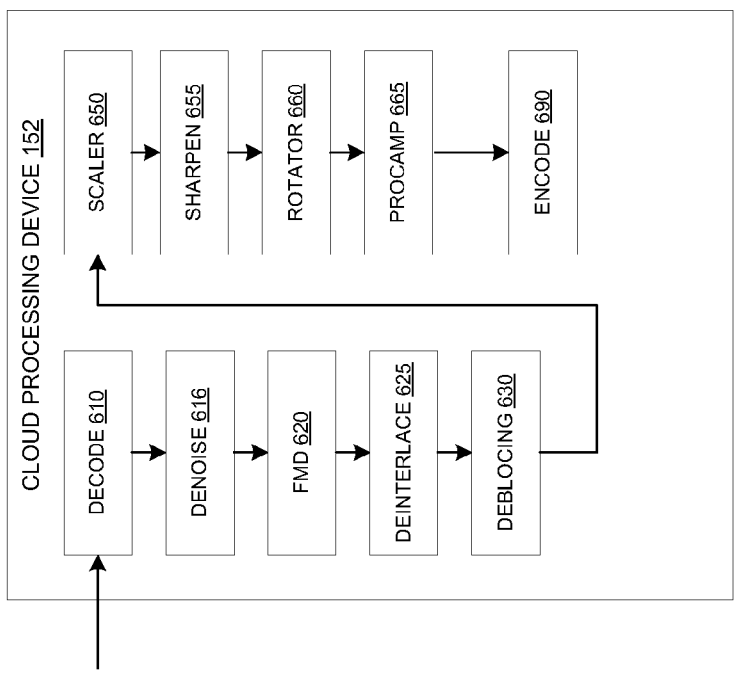
FIG. 6 illustrates video processing tasks performed by the cloud processing device in response to receiving a request to perform VP tasks from the client device in accordance with one embodiment.

In block 440, the cloud processing device 152 may perform decoding of the video data (or video file) stored in the cloud database 158. In one embodiment, the cloud processing device 600, which may be one such as the device 152, may perform decoding as shown in the decode block 610 of FIG. 6. In one embodiment, the cloud processing device 600 may then provide the decoded video data to other processing blocks.

In block 450, the cloud processing device 152 may perform processing of video data using the VPPs received. In one embodiment, the cloud processing device 152 may perform one or more of the operations or processing tasks depicted in FIG. 6. In one embodiment, the cloud processing device 152 may perform de-noising as depicted by the de-noise 616, firm mode detection as depicted by the FMD 620, de-interlacing as depicted by the deinterlace 625, and deblocking as depicted by the deblocking 630. In one embodiment, the cloud processing device 152 may perform the other processing tasks such as the scaling as depicted by the scaler 650, sharpening as depicted by the sharpener 655, rotation as depicted by the rotator 660, and processing amplifier task as depicted by the ProcAmp 665. In one embodiment, the cloud processing device 600 may perform one or more of the above processing tasks.

In block 460, the cloud processing device 600 may perform video encoding task as depicted by the encoder 690. In block 470, the cloud processing device 152 may create a video file based on processing the video data using the VPPs. In one embodiment, the cloud processing device 152 may store the video file in the cloud database 158. In other embodiment, the cloud processing device 152 may send the video file to the client device 110-A.

Figure 9:
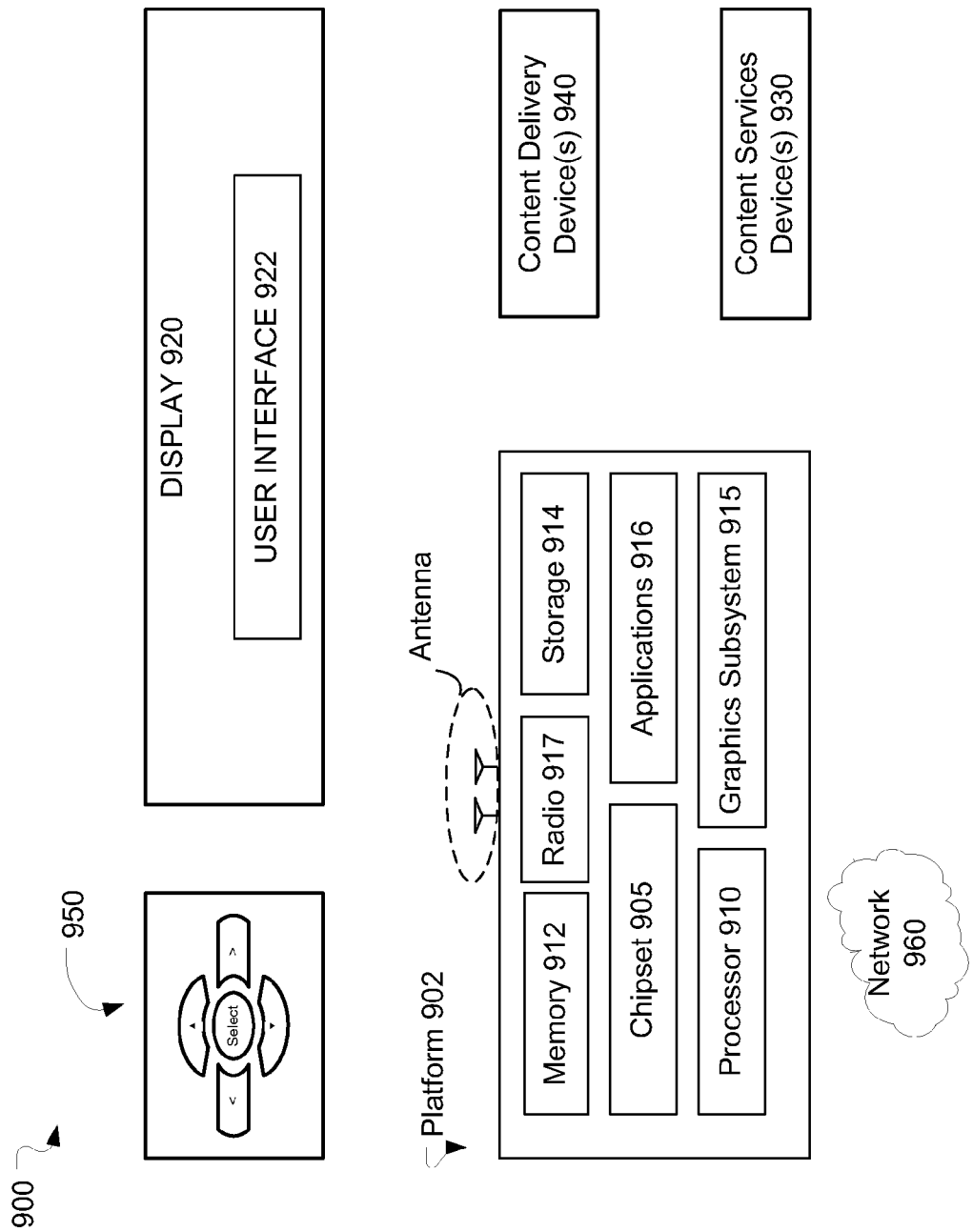
FIG. 9 is a computer system, which may support processing of video data in the cloud according to one embodiment.

FIG. 9 illustrates an embodiment of a system 900. In embodiments, system 900 may be a media system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 900 comprises a platform 902 coupled to a display 920. Platform 902 may receive content from a content device such as content services device(s) 930 or content delivery device(s) 940 or other similar content sources. A navigation controller 950 comprising one or more navigation features may be used to interact with, for example, platform 902 and/or display 920. Each of these components is described in more detail below.

In embodiments, platform 902 may comprise any combination of a chipset 905, processor 910, memory 912, storage 914, graphics subsystem 915, applications 916 and/ or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 910 may comprise dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 914 may comprise technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 could be integrated into processor 810 or chipset 905. Graphics subsystem 915 could be a stand-alone card communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 918 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In embodiments, display 920 may comprise any television type monitor or display. Display 920 may comprise, for example, a computer display screen, touch screen display, video monitor, television-like device, and/or a television. Display 920 may be digital and/or analog. In embodiments, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In embodiments, content services device(s) 930 may be hosted by any national, international and/or independent service and thus accessible to platform 902 via the Internet, for example. In one embodiment, the content services device(s) 930 may be hosted in a cloud such as the cloud 150 described above. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920. In one embodiment, the content services devices 930 and 940 may include a platform such as the platform 902, which may receive requests from the platform 902 provided within a client device such as the client device 110 and may perform video processing tasks as described above.

In embodiments, content services device(s) 930 may comprise a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 receives content such as cable television programming including media information, digital information, and/or other content. Examples of content providers may include any cable or satellite television or radio or Internet content providers. The provided examples are not meant to limit embodiments of the invention.

In embodiments, platform 902 may receive control signals from navigation controller 950 having one or more navigation features. The navigation features of controller 950 may be used to interact with user interface 922, for example. In embodiments, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be echoed on a display by movements of a pointer, cursor, focus ring, or other visual indicators displayed on the display. For example, under the control of software applications 916, the navigation features located on navigation controller 950 may be mapped to virtual navigation features displayed on user interface 922, for example. In embodiments, controller 950 may not be a separate component but integrated into platform 902 and/or display 920. Embodiments, however, are not limited to the elements or in the context shown or described herein.

In embodiments, drivers (not shown) may comprise technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 when the platform is turned "off." In addition, chip set 905 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the invention.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
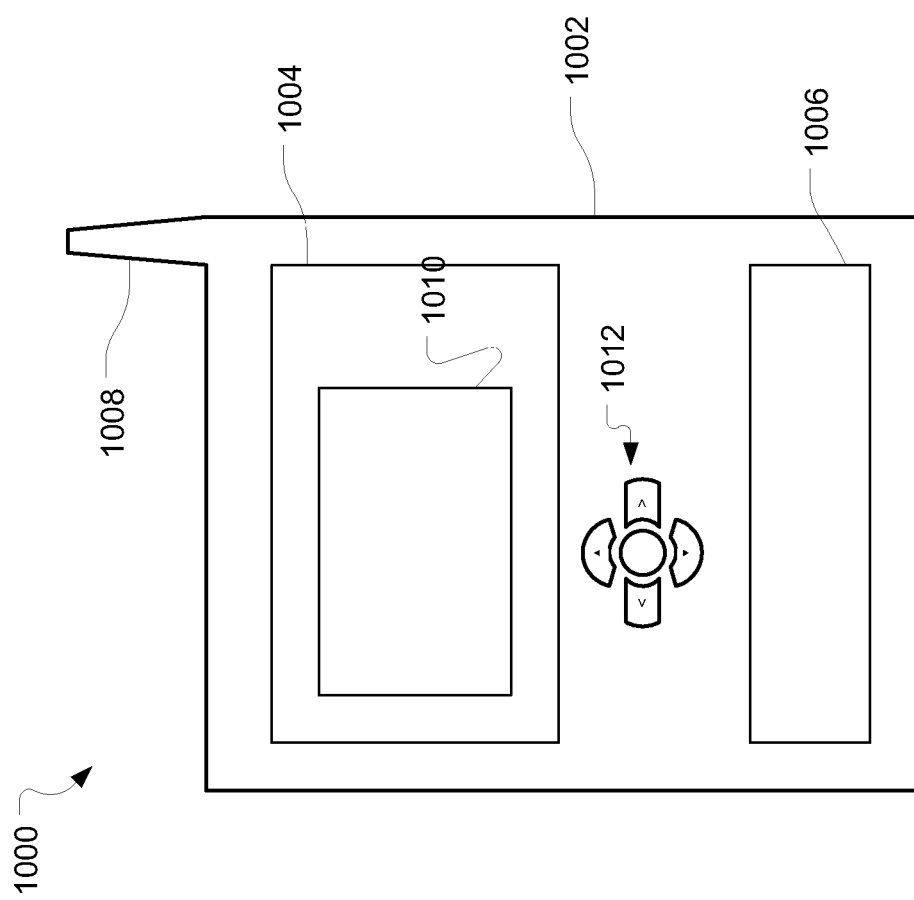
FIG. 10 is a wireless mobile device, which may support processing of video data in the cloud according to one embodiment.

As described above, system 900 may be embodied in varying physical styles or form factors. FIG. 10 illustrates embodiments of a small form factor device 1000 in which system 1000 may be embodied. In embodiments, for example, device 1000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may comprise a housing 1002, a display 1004, an input/output (I/O) device 1006, and an antenna 1008. Device 1000 also may comprise navigation features 1012. Display 1004 may comprise any suitable display unit for displaying information appropriate for a mobile computing device. I/O device 1006 may comprise any suitable I/O device for entering information into a mobile computing device. Examples for I/O device 1006 may include an alphanumeric keyboard, a numeric keypad, a touch pad, input keys, buttons, switches, rocker switches, microphones, speakers, voice recognition device and software, and so forth. Information also may be entered into device 1000 by way of microphone. Such information may be digitized by a voice recognition device. The embodiments are not limited in this context. The device 1000, in one embodiment, may include foldable integrated display panels, which may be unfolded to have a bigger display area.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:
1. A client device, comprising:
  a computing platform, wherein the computing platform includes a core, an uncore, a video controller, an input-output interface, a network interface, and a display interface,
  wherein the network interface is to couple the client device to a network, and
  wherein the display interface is to couple the client device to a display,
  wherein the video controller is to,
    determine if one or more video processing tasks are to be performed in a cloud processing device coupled to the client device, wherein the video controller is to determine that the one or more video processing tasks are to be performed in the cloud processing device based on a decoding capability of the client device, send one or more video processing parameters to the cloud processing device in response to the determining that the one or more video processing tasks are to be performed in the cloud processing device, receive a signal indicating that a video file created after processing a video data using the one or more video processing parameters is available, retrieve the video file, and render the video file on the display.

2. The client device of claim 1, wherein the video controller is to determine that the one or more video processing tasks are to be performed in the cloud processing device if the client device is battery operated.

3. The client device of claim 1, wherein the video controller is to determine that the one or more video processing tasks are to be performed in the cloud processing device if the client device is retrieving the video file in an online mode.

4. The client device of claim 1, wherein the one or more video parameters is to include at least one of scaling, sharpening, rotation, or process amplification parameters.

5. The client device of claim 1 the video controller is to, receive the video data, which fits into a screen size of the client device in response to sending one or more modified video processing parameters, and render the video data on the screen, wherein the size of the video data is of a first size if the screen size is small and the size of the video data is of a second size if the screen size is medium and the size of the video data is of a third size if the screen size is large, wherein the first size is less than the second size and the second size is less than the third size.

6. The client device of claim 1, wherein the video controller is to, receive the video data of a resolution that is determined based on a network bandwidth supported by the interface to the network, and render the video data on the display based on the resolution of the video data, wherein the resolution of the video data is determined based on an available network bandwidth value, wherein the resolution is lower if the available network bandwidth is less and the resolution is higher is the available network bandwidth value is higher.

7. A cloud processing device, comprising:

a computing platform, wherein the computing platform includes a core, an uncore, a video controller, an input-output interface, a network interface, and a display interface, wherein the network interface is to couple the cloud processing device to a network, wherein the core area is to include a plurality of processing cores and one or more graphics control units, wherein the video controller is to, receive one or more video processing parameters after receiving a request to process a video data using the video processing parameters, wherein the request to process the video data in the cloud processing device is received if a client device coupled to the cloud processing device has lesser processing capability to decode video data on the client device, assign one or more of the graphics control units to process the video data using the one or more video processing parameters, wherein the one or more graphics control units is to, process the video data based on the one or more video processing parameters, create a video file after processing the video data, store the video file, send a signal to indicate that the video file is ready for retrieval.

8. The cloud processing device of claim 7, wherein the video controller is to determine, in response to receiving the request, if a video file corresponding to the video data is already is available before sending a signal, which is to indicate that the video file is ready for retrieval.

9. The cloud processing device of claim 7, wherein the video controller is to assign the one or more graphics control units to process the video data after determining that the video file is not available.

10. The cloud processing device of claim 9, wherein the one or more graphics control units is to perform one or more of scaling, sharpening, rotation, or process amplification tasks on the video data using the video processing parameters.

11. The cloud processing device of claim 7, wherein the one or more graphics control unit is to, generate one or more optimized video processing parameters in response to receiving one or more modified video processing parameters, process the video data using the optimized video processing parameters, and generate the video data of a resolution corresponding to the one or more modified video processing parameters, wherein the resolution is a first size if a screen size of a client device is small, the resolution is of a second size if the screen size of the client device is medium, and the resolution is of a third size if the screen size of the client device is large, wherein the first size is less than the second size and the second size is less than the third size.

12. The cloud processing device of claim 7, wherein the one or more graphics control units is to generate the video data of a size based on a network bandwidth value, wherein the network bandwidth value represents an available bandwidth on a link coupling the cloud processing device and the client device through the network.

13. The cloud processing device of claim 12, wherein the size of the video data is determined based on the network bandwidth value, wherein the size is lower if the network bandwidth is less and the size is higher if the network bandwidth value is higher.

14. A method in a client device, comprising:

coupling the client device to a network and a display, determining if one or more video processing tasks are to be performed in a cloud processing device coupled to the client device, sending one or more video processing parameters to a cloud processing device in response to the determining that one or more video processing tasks are to be performed in the cloud processing device, wherein determining that the one or more video processing tasks are to be performed in the cloud processing device is based on a rotation request or a subtitle language request selected by a user of the client device, receiving a signal indicating that a video file is available, wherein the video file is created after processing a video data using the one or more video processing parameters, retrieving the video file, and rendering the video file on the display.

15. The method of claim 14, wherein determining that the one or more video processing tasks are to be performed in the cloud processing device based on checking if the client device is battery operated.

16. The method of claim 14, wherein determining that the one or more video processing tasks are to be performed in the client processing device includes checking if the client device is retrieving the video file in an online mode.

17. The method of claim 14, wherein the one or more video parameters is to include at least one of scaling, sharpening, rotation, or process amplification parameters.

18. The method of claim 14 comprises:

receiving the video data, which fits into a screen size of the client device in response to sending one or more modified video processing parameters, and rendering the video data on the screen, wherein the size of the video data is of a first size if the screen size is small and the size of the video data is of a second size if the screen size is medium and the size of the video data is of a third size if the screen size is large, wherein the first size is less than the second size and the second size is less than the third size.

19. The method of claim 14 comprises:

receiving the video data of a resolution that is determined based on a network bandwidth supported by the interface to the network, and rendering the video data on the display based on the resolution of the video data, wherein the resolution of the video data is determined based on an available network bandwidth value, wherein the resolution is lower if the available network bandwidth is less and the resolution is higher is the available network bandwidth value is higher.

20. A method in a cloud processing device, comprising:

coupling the cloud processing device to a client device through a network, receiving the video data and one or more video processing parameters after receiving a request to process the video data using the video processing parameters, wherein the request to process the video data in the cloud processing device is received if a client device coupled to the cloud processing device has lesser processing capability to decode video data on the client device, assigning one or more of the graphics control units to process the video data using the one or more video processing parameters, processing the video data based on the one or more video processing parameters, creating a video file after processing the video data, storing the video file, sending a signal to indicate that the video file is ready for retrieval.

21. The method of claim 20, comprises determining, in response to receiving the request, if a video file corresponding to the video data is already is available before sending a signal, which is to indicate that the video file is ready for retrieval.

22. The method of claim 21 includes assigning one or more graphics control units to process the video data after determining that the video file is not available.

23. The method of claim 22 comprises performing one or more of scaling, sharpening, rotation, or process amplification tasks on the video data using the video processing parameters.

24. The method of claim 23 comprises:

generating one or more optimized video processing parameters in response to receiving one or more modified video processing parameters, processing the video data using the optimized video processing parameters, and generating the video data of a resolution corresponding to the one or more modified video processing parameters, wherein the resolution is a first size if a screen size of a client device is small, the resolution is of a second size if the screen size of the client device is medium, and the resolution is of a third size if the screen size of the client device is large, wherein the first size is less than the second size and the second size is less than the third size.

25. The method of claim 23 comprises generating the video data of a size based on a network bandwidth value, wherein the network bandwidth value represents an available bandwidth on a link coupling the cloud processing device and the client device through the network.

26. The method of claim 25, wherein the size of the video data is determined based on the network bandwidth value, wherein the size is lower if the network bandwidth is less and the size is higher if the network bandwidth value is higher.

* * * * *